United States Patent [19]

Jones et al.

[11] Patent Number: 4,511,388
[45] Date of Patent: Apr. 16, 1985

[54] PRODUCTION OF HIGH-ANALYSIS AMMONIUM ORTHOPHOSPHATE SUSPENSION FERTILIZERS BY A NEW BATCH-TYPE PROCESS

[75] Inventors: Thomas M. Jones, Sheffield; Lucian A. Kendrick, Jr., Florence, both of Ala.

[73] Assignee: Tennessee Valley Authority, Muscle Shoals, Ala.

[21] Appl. No.: 584,285

[22] Filed: Feb. 27, 1984

Related U.S. Application Data

[63] Continuation of Ser. No. 546,261, Oct. 28, 1983, Pat. No. T104,501.

[51] Int. Cl.³ .............................................. C05B 7/00
[52] U.S. Cl. .......................................... 71/34; 71/36; 71/43; 71/64.08; 423/313
[58] Field of Search .............. 71/34, 36, 43, 44, 64.08, 71/64.10; 423/167, 319, 320, 305, 306, 313, 309

[56] References Cited

U.S. PATENT DOCUMENTS

| | | | |
|---|---|---|---|
| 3,949,058 | 4/1976 | Young et al. | 71/43 X |
| 4,397,675 | 8/1983 | Young | 71/43 X |
| 4,427,432 | 1/1984 | Mann, Jr. et al. | 71/42 X |
| 4,445,926 | 5/1984 | Mills et al. | 71/34 |

Primary Examiner—Ferris H. Lander
Attorney, Agent, or Firm—Robert A. Petrusek

[57] ABSTRACT

An improved process for the production of highly concentrated ($N-P_2O_5$) suspension fertilizers effected by the ammoniation of wet-process or other impure orthophosphoric acids in batch-type equipment. The underlying concept which goes to the gist of the instant invention involves the use of a heel of product from a previously prepared batch to provide nuclei and a suitable environment for the conversion of the metallic impurities therein into crystalline habits rather than the usual highly undesirable form of metallic impurity gel-like compounds, which gels cause extremely high viscosities, nonpourability, and complete destruction of fluidity in concentrated ammonium phosphate suspension fertilizers prepared by prior-art procedure. Also, during the ammoniation of acids by the instant process, the heel maintained therein prevents severe thickening due to mass crystallization of monoammonium phosphate, which severe thickening normally results in either/or extremely slow further ammoniation and excessive ammonia losses. Practice of this method is simple, economical, versatile, and performed in readily available equipment.

10 Claims, 1 Drawing Figure

BATCH PRODUCTION OF AMMONIUM ORTHOPHOSPHATE
BASE SUSPENSION FERTILIZERS

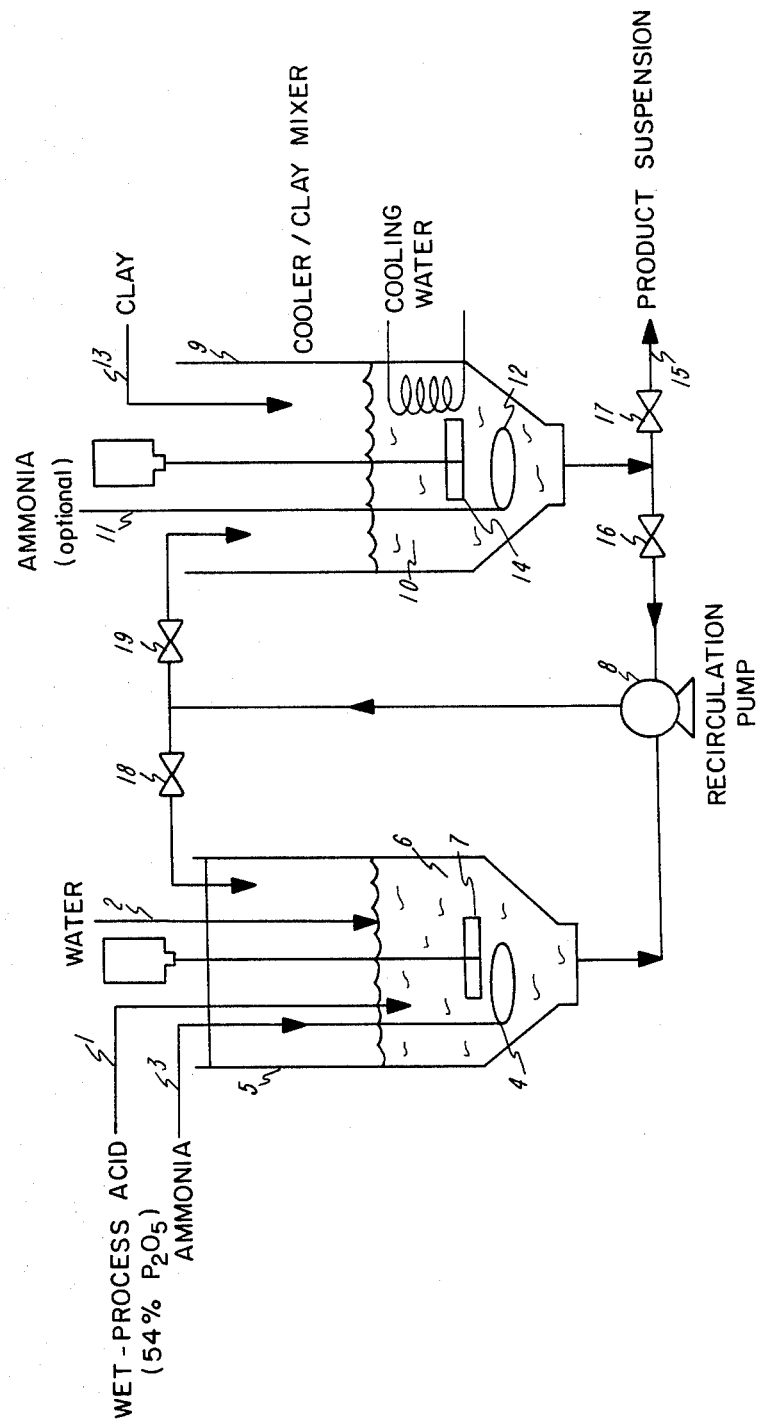

PRODUCTION OF HIGH-ANALYSIS AMMONIUM ORTHOPHOSPHATE SUSPENSION FERTILIZERS BY A NEW BATCH-TYPE PROCESS

The invention herein described may be manufactured and used by or for the Government for governmental purposes without the payment to us of any royalty therefor.

This application is a continuation of application Ser. No. 546,261, filed Oct. 28, 1983, now U.S. Pat. No. T104501, Aug. 7, 1984, for PRODUCTION OF HIGH-ANALYSIS AMMONIUM ORTHOPHOSPHATE SUSPENSION FERTILIZERS BY A NEW BATCH-TYPE PROCESS.

INTRODUCTION

The present invention relates to an improved method for the production of concentrated suspension fertilizers of high quality from low-cost impure raw materials by a simple, economical, batch-type process. In particular, the present invention relates to a novel, economical method for the production of high-analysis ammonium phosphate suspension fertilizers by a simple, economical, batch-type process resulting from ammoniation of either wet-process impure orthophosphoric acids, slurries of solid intermediates and/or combinations thereof. More particularly, the present invention relates to means and methods for the efficient production of high-grade suspension fertilizers containing small crystals, and characteristics of low viscosity, high pourability, and long-term storage properties by a simple, economical, batch-type process.

BACKGROUND OF THE INVENTION

1. Field of the Invention

Heretofore, suspension fertilizers produced by direct ammoniation of merchant-grade wet-process or other impure orthophosphoric acids in batch-type equipment were required to be of low grade in order to avoid the occurrence of high viscosities, which high viscosities tend to destroy the fluidity of such suspensions and render the transfer properties thereof either by gravity or pumping distribution to the soil impractical or impossible. Suspension fertilizers with such low analysis have a very distinct economic disadvantage as compared with higher analysis products because costs of handling, freight, storage, and application are higher per unit of plant nutrient.

2. Description of the Prior Art

The art of producing fluid fertilizers, both liquids and suspensions, is well known and fully described in the literature. See, for example, the following patents:

| U.S. Pat. No. | Author | Date |
| --- | --- | --- |
| 3,015,552 | Striplin, et al | January 2, 1962 |
| 3,019,099 | Walters | January 30, 1962 |
| 3,109,729 | Slack, et al | November 5, 1963 |
| 3,113,858 | Slack, et al | December 10, 1963 |
| 3,148,970 | Smith, et al | September 15, 1964 |
| 3,192,013 | Young | June 29, 1965 |
| 3,234,004 | Smith, et al | February 8, 1966 |
| 3,326,666 | Walters | June 20, 1967 |
| 3,382,059 | Getsinger | May 7, 1968 |
| 3,459,499 | Mullen | August 5, 1969 |
| 3,697,247 | Jones, et al | October 10, 1972 |
| 3,813,233 | Kendrick | May 28, 1974 |
| 4,066,432 | Jones | January 3, 1978 |
| 4,375,980 | Jones, et al | March 8, 1983 |

The most common method of producing both liquid and suspension fertilizers containing nitrogen and phosphate is by the ammoniation of phosphoric acids or slurries of solid products derived therefrom, such as, for example, monoammonium phosphate. For many years, all ammonium phosphate fluid fertilizers with both high analyses and good physical properties contained substantial proportions of the $P_2O_5$ values therein in the form of polyphosphates. Polyphosphates increased the solubility of the phosphate salts and sequestered congeneric metallic impurity compounds present, which salts and compounds otewise would contribute to the formation of gel-like compounds that completely destroy the fluidity of concentrated suspension fertilizers. However, only in recent years was suitable technology developed for the production, from impure phosphoric acids, of satisfactory concentrated orthophosphate suspension fertilizers by methods which overcome the effect caused by the formation of the metallic impurity gel-like compounds, which compounds normally tend to destroy the fluidity of concentrated ammonium orthophosphate suspension fertilizers. Until the development of the latest technology, the only way known for increasing the fluidity of such orthophosphate suspensions was by means of dilution of same with water, which means, of course, reduced the grades thereof.

In 1962, Walters ('099 supra) produced a low-analysis (8-24-0 grade) ammonium orthophosphate suspension fertilizer by both batch- and continuous-type ammoniation of wet-process orthophosphoric acids. In the preparation of this suspension fertilizer product, Walters recognized that the impurities in the acid imparted a thixotropic characteristic causing higher grade suspension fertilizers to be excessively viscous. Walters used the gel-like impurity compounds for prevention of sedimentation in his suspension fertilizer products. Later Slack et al ('929 and '858, supra) produced NPK suspension fertilizers in which they added both polyphosphate for increasing the grade, and clay as both a nucleating and suspending agent. In 1974 Kendrick ('233 supra) fully described the techniques and conditions under which ammonia can be reacted with impure wet-process orthophosphoric acid without producing the gel-like impurity compounds that previously completely destroyed the fluidity of high-grade orthophosphate suspension products. Kendrick's teachings were based primarily on ammoniation of the impure wet-process acid in two continuous stages or steps and through the techniques he developed, he was able to produce much higher grade products (e.g., 11-39-0 vs. 10-30-0) with good flow characteristics and long-term static storage life than heretofore had been possible. Kendrick also produced similar products by a batch-simultaneous procedure which he indicated did not work quite as well as did his continuous process. However, when products that were produced as taught by Kendrick were shipped by rail, the solid portion of the suspensions settled and packed. The resulting packed crystals held tenaciously to the bottom of the railroad tank cars. Settling of the crystals changed the composition of the fluid and the packed crystals could not be removed from the tank by ordinary procedures, thereby greatly reducing the value of the suspension fertilizer. In 1977 Jones ('432 supra) developed a three-stage, continuous-type process for the production of satisfactory high-analysis suspension fertilizers (e.g. 13-38-0) by the ammoniation of wet-process orthophosphoric acid under conditions wherein gel-like impurity compounds were not formed. In the materials produced by the teachings of Jones, supra, the resulting crystals did not settle and pack due to the application thereto of vibrational energy such as that which occurs during shipment by rail. However, until the present time, all efforts to produce high-analysis ammonium orthophosphate ($N-P_2O_5$) base suspensions (e.g., 12-36-0, 1.5 percent clay, to 13-38-0, 1.5 percent clay) with satisfactory physical properties by the ammoniation of impure wet-process orthophosphoric acid in simple, economical, batch-type equipment instead of the more expensive and more complicated continuous-type equipment described by Jones in '432 supra, have been unsuccessful.

SUMMARY OF THE INVENTION

The present invention relates to an improved batch-type method for the production of highly concentrated ($N-P_2O_5$) suspension fertilizers effected by the ammoniation of wet-process or other impure orthophosphoric acids, or from slurries of solids produced from such acids (e.g., monoammonium phosphate or urea phosphate) or combinations thereof (e.g., wet-process acid plus mono- or diammonium phosphate). The instant method involves the use of a heel of hot product reserved from a previously prepared batch to provide the nuclei and a suitable environment in the reactor for effecting the production of metallic impurity crystals therein instead of the usual metallic impurity gel-like compounds, which compounds normally cause the complete destruction of fluidity in highly concentrated orthophosphate suspension products. The heel also acts to increase the solubility and pH of the materials introduced into the reactor which, in turn, tends to prevent the severe thickening thereof as mass crystallization of monoammonium phosphate occurs in the reactor as the pH thereof passes through the range of about 2 to 4.

OBJECTS OF THE INVENTION

It is therefore the principal object of the present invention to provide a simple, economical, batch-type process for the production of high-analysis, high-quality phosphate suspension fertilizers from low-cost raw materials, such as ammoniation of wet-process or other impure phosphoric acids, or slurries of solid intermediates derived therefrom (e.g., monoammonium phosphate or urea phosphate), or from various combinations (e.g., wet-process acid plus mono- or diammonium phosphate).

Another object of the present invention is to produce concentrated free flowing suspension fertilizers by a simple, economical process that can be used by small or large fertilizer producers alike and can be operated under conditions that prevent mass crystallization that causes intolerable slowing down or stoppages in the ammoniation procedure.

A still further object of the present invention is to produce high grade, high quality ammonium ortho- or polyphosphate suspension fertilizers from solid intermediates or wet-process or other impure orthophosphoric acids (or combinations thereof) under conditions that prevent formation of gelatinous metallic impurity compounds, which compounds cause intolerably high viscosities, nonpourability, and complete destruction of the fluidity of concentrated ammonium orthophosphate suspension fertilizers.

Still a further object of the present invention is to economically produce ortho- or polyphosphate suspension fertilizers from low-cost materials by a simple batch-type process without sacrifice in suspension quality, grade, or versatileness.

Still further and more general objects and advantages of the present invention will appear from the more detailed description set forth in the following descriptions and examples, it being understood, however, that this more detailed description is given by way of illustration and explanation only and not necessarily by way of limitation, since various changes therein may be made by those skilled in the art without departing from the true scope and spirit of the instant invention.

DESCRIPTION OF THE PREFERRED EMBODIMENT

In carrying out the objects of our invention in one form thereof, we have found that highly concentrated ammonium orthophosphate base suspension fertilizers with both high grade and excellent physical properties can be produced by ammoniation of wet-process or other impure orthophosphoric acids, slurries of solid intermediates derived therefrom, or combinations of these two thereof, in a batch-type reactor containing a heel of suspension fertilizer, said heel reserved from a previously prepared batch. We have found further that the heel serves to prevent severe thickening or near solidification due to mass crystallization of fertilizer salts in the pH region of about 2 to 4. We have found still further that the heel can also be utilized to provide both seed crystals and a suitable environment for the production and growth of metallic impurity crystals instead of the usual production of impurity gel-like compounds that cause intolerably high viscosities, nonpourability, and destruction of fluidity in highly concentrated ammonium orthophosphate suspension fertilizers produced from either impure orthophosphoric acids, or slurries of solid intermediates derived therefrom, or combination thereof of the two. In addition, we have discovered that the use of a heel of hot material from a previously prepared batch is most effective in preventing severe thickening or near solidification of the resulting ammonium orthophosphate as it is ammoniated through the pH range of about 2 to 4, and that the size of the heel can be varied over a wide range dependent, to a large extent, upon the materials used as feed and upon the type and grade of product produced. It has been found that to be most efficient and most effective, the heel should occupy between about one-fourth and about one-half of the total volume of the batch. With most raw materials used and the grades of the products produced, the most desired volume is about one-third of the total batch volume.

The principal advantage realized by practicing the teachings of the instant invention is that high-analysis ammonium orthophosphate base suspensions of excellent quality can now be rapidly produced from low-cost raw materials such as wet-process or other impure orthophosphoric acids, or slurries of solid intermediates, or combinations thereof, by a simple economical batch-type procedure. The equipment, which consists of a reactor and a cooler-clay mixer is simple, relatively inexpensive, versatile, and perhaps most importantly, most of it is already readily available in a multitude of existing plants. Therefore, the suspensions and liquids produced therefrom may vary widely in grade and use. Because of the simplicity and versatileness of the process, together with the comparatively low cost of equipment and raw materials, it should be attractive to both small- and large-scale fertilizer manufacturers.

DESCRIPTION OF THE DRAWINGS

Our invention, together with further objectives and advantages thereof, will be better understood from a consideration of the following description taken in connection with the accompanying drawing and examples in which the FIGURE is a flowsheet generally illustrating the principles of our novel batch-type process.

Referring now more specifically to the FIGURE, raw materials consisting of wet-process or other impure phosphoric acids or slurries of solid intermediates, or various combinations of both, together with water for dilution, are fed from sources not shown via lines 1 and 2 to reactor 5 illustrated as containing a heel of product 6 reserved from a previously prepared batch. Ammonia from a source not shown is fed via line 3 and sparger 4 into reactor 5. As shown, reactor 5 is equipped with stirrer 7. The resulting reaction products are transferred with transfer means 8 from reactor 5 to cooler-clay mixer 9 where it is quickly cooled from a temperature range of from about 175° F. to about 230° F. down to the range of about 120° F. to about 140° F. by introducing same into an agitated pool of previously cooled product 10, i.e., about 80° F., to thereby effect the production therein of an abundance of small ammonium phosphate crystals. The size of the pool in our equipment was about one-third that of the total batch volume; however, it can be varied as desired to produce crystals of proper size. In the production of, for instance, 13-38-0 grade suspension, a final increment of ammonia is fed to cooler 9 via line 11 and distributed by sparger 12. In the production of 11-39-0 grade suspension, all of the required ammonia may be added to reactor 5. As shown, clay is fed to cooler 9 through line 13 and mixed with stirrer 14 and recirculated with transfer means 8 to gel same therein. The final product suspensions are subsequently discharged via line 15 to storage (not shown), shipment, or cold blending with potassium chloride and nitrogen suspensions for production of various N-$P_2O_5$-$K_2O$ suspensions for application to the soil. Check valves 16, 17, 18, and 19 allow for transfer of material from cooler 9 to storage and for recirculating via pump 8 through the cooling and reacting loops.

In order that those skilled in the art may better understand how the present invention may be practiced for the production of high-grade orthophosphate suspension fertilizers with small crystals, good flow characteristics and excellent storage properties, the following examples are given by way of illustration only and not necessarily by way of limitation.

EXAMPLE I

This example illustrates the differences in suspensions prepared by the usual batch-type process from ammonia and wet-process orthophosphoric acid with those prepared in accordance with the main embodiment of the present invention.

Nitrogen phosphate base suspension fertilizers with grade of about 13-80-0, 1.5 percent clay and high quality were produced in a 500-pound batch-type pilot plant by ammoniation of merchant-grade, wet-process orthophosphoric acid derived from Central Florida ore by our new process. These suspensions are suitable for shipment by rail and for long-term storage. They are primarily intended for use in the subsequent production of mixed grade suspension products of various N:$P_2O_5$:$K_2O$ ratio and grade by well known cold-blending procedures, but of course, can be, if desired, applied directly to the soil.

The procedure for operation of our pilot plant batch-type equipment for the production of the base suspensions shown in Table I, infra, consisted of leaving a heel of hot product in the reactor from the previous batch. The volume of heel used in the tests was equal to about 33 percent (one-third) of the total batch volume. The hot heel acts to dilute the impure merchant-grade, wet-process acid and to increase the pH and solubility of the material in the reactor, thus avoiding the severe complications caused by excessive crystallization of monoammonium phosphate. The heel also acts to furnish nuclei and a suitable environment for precipitation and growth of the metallic impurities in crystalline form rather than as the undesirable and intolerable metallic impurity gel-like compounds. The wet-process acid and water for the new batch are added to the heel with stirring. The material is then rapidly ammoniated to a pH of about 6 after which about two-thirds of the reactor contents are pumped to the cooler-clay mixer. Water and merchant-grade, wet-process orthophosphoric acid for a new batch are then added to the reactor containing the heel (one-third of the previous batch). In the cooler-clay mixer, the material from the reactor is quickly cooled from about 230° F. to the range of 120° F. to 140° F. for production of the abundance of small mono- and diammonium phosphate crystals required for prevention of excessive crystal growth during storage. A small additional amount of ammonia is added in the cooler for increasing the pH to about 6.3 (or 7.0, diluted 1 to 4$H_2O$) and removal of MAP crystals that were present. About 1.5 percent attapulgite clay is added and incorporated with the slurry with a turbine-type agitator and a recirculation pump to suspend the crystals. The total time required in these tests for the production of a 500-pound batch is about 25 to 30 minutes.

The product suspensions are compared in Table I, infra, with similar suspensions that were produced by the three-stage continuous process as taught by Jones '432, supra, and with suspensions of highest possible satisfactory grade produced by the normal prior-art type single-stage batch process.

Satisfactory base suspension fertilizers are required to have viscosities that do not exceed the limits of 1000 centipoises at 80° F. and 1500 centipoises at 32° F. when measured with a Brookfield viscometer (Model LVT). They are also at least 98 percent pourable in one minute at both 80° F. and 32° F. and contain no large (+20 mesh-850 micrometers) crystals.

TABLE I

Phosphate Base Suspension Fertilizers Made by Ammoniation of Wet-Process Orthophosphoric Acid[a] Derived from Central Florida Phosphate Ore. Comparison of Products Made by the New Batch-Type Procedure[b] With Those Produced by the Three-Stage Continuous and the Normal Batch-Type Processes

| Test No. | Suspension grade[c] | Initial viscosity,[d] cP at 80° F. | After storage for 30 days at 100° F. | |
|---|---|---|---|---|
| | | | Viscosity, cP at 80° F. | Pourability,[e] % of total volume |
| Batch-type process of the instant invention | | | | |
| 1 | 13.7-39.3-0 | 900 | 1100 | 100 |
| 2 | 13.3-38.3-0 | 700 | 700 | 100 |

TABLE I-continued

Phosphate Base Suspension Fertilizers Made by Ammoniation of Wet-Process Orthophosphoric Acid[a] Derived from Central Florida Phosphate Ore. Comparison of Products Made by the New Batch-Type Procedure[b] With Those Produced by the Three-Stage Continuous and the Normal Batch-Type Processes

| Test No. | Suspension grade[c] | Initial viscosity,[d] cP at 80° F. | After storage for 30 days at 100° F. | |
|---|---|---|---|---|
| | | | Viscosity, cP at 80° F. | Pourability,[e] % of total volume |
| 3 | 13.3-38.1-0 | 650 | 600 | 100 |
| 4 | 12.6-36.0-0 | 300 | 350 | 100 |
| Three-stage continuous process | | | | |
| 5 | 13.5-39-0-0 | 1100 | 1200 | 100 |
| 6 | 13.5-38-3-0 | 850 | 900 | 100 |
| 7 | 13.1-38.4-0 | 800 | 1000 | 100 |
| Normal batch-type process | | | | |
| 8 | 12-36-0 | 1100 | >50,000 | 0 |
| 9 | 11-33-0 | 1000 | >10,000 | 0 |
| 10 | 10-30-0 | 150 | 150 | 100 |

[a]Wet-process acid contained 53.0% $P_2O_5$, 3.4% $SO_4$, 1.4% $Al_2O_3$, 1.7% $Fe_2O_3$, 0.70% MgO, 0.07% CaO, and 0.99% F.
[b]Process consisted of equipment shown in FIG. 1.
[c]Suspensions contained 1.5% attapulgite clay and no crystals exceeded the limit of 850 micrometers.
[d]Suspensions were mixed 5 minutes with a propeller-type stirrer operated at a tip speed of 7 ft/s before measurements were made.
[e]After agitation supplied by gently rotating a stirring rod twice around inside of container.

The results shown in Table I supra clearly indicate that the high quality suspension produced by our new batch-type process can be at least as high in grade as 13-38-0, 1.5 percent clay. These suspensions (tests 1, 2, and 3) made by our new batch-type process, are about equal in grade and quality to those prepared by the three-stage process (tests 5, 6, and 7) and are of far higher grade than can be produced by the usual single-stage batch production process (tests 8, 9, and 10).

EXAMPLE II

Nitrogen-phosphate base suspension fertilizers with grade 11-39-0, 1.5 percent clay, that are entirely satisfactory for application to the soil, use in production of mixed suspension fertilizers with various ratio and grade, or long-term quiescent storage were produced by our new batch-type procedure from merchant-grade, wet-process orthophosphoric acid derived from Central Floride ore as was describd in Example I above. The 11-39-0, 1.5 percent clay suspension is not recommended for shipment over long distances by rail or for winter storage in the coldest regions of the country. The formulation and operating conditions for production of an 11-39-0, 1.5 percent clay suspension with good physical properties are shown in Table II below.

TABLE II

Operating Conditions for Production of 11-39-0, 1.5 Percent Clay Suspension Fertilizers from Merchant-Grade Wet-Process Orthophosphoric Acid by our New Batch-Type Procedure

| | | |
|---|---|---|
| Batch reactor | | |
| Feed, lb (kg) | | |
| Heel[a] (11-39-0) | 165 | (75) |
| Water | 86 | (39.1) |
| Wet-process phosphoric acid (54% $P_2O_5$) | 242 | (110) |
| Ammonia | 45 | (20.5) |
| Temperature (boiling)[b] °F. (°C.) | 230 | (110) |
| Agitator tip speed, ft/s (m/s) | 33 | (10) |
| Mixing time, min | 15 | |
| Cooler | | |
| Temperature,[c] °F. (°C.) | 130 | (54) |
| Clay added, lb (kg) | 7.5 | (3.4) |
| Agitator tip speed, ft/s (m/s) | 33 | (10) |
| Mixing time, min | 10 | |
| Product (11-39-0, 1.5% clay) | | |
| Batch size, lb (kg) | 500 | (226.8) |
| Total batch time, min | 25 | |
| pH (undiluted) | 6.0 | |
| Specific gravity at 80° F. (27° C.) | 1.43 | |
| Temp. (as sent to storage), °F. (°C.) | 100 | (37.7) |
| Initial viscosity, cP (Pa · s) | | |
| 80° F. (27° C.) | 800 | (0.8) |
| 32° F. (0° C.) | 1300 | (1.3) |
| Initial pourability, % by vol | | |
| 80° F. (27° C.) | 100 | |
| 32° F. (0° C.) | 100 | |
| Initial crystal size (monoammonium phosphate), μm | 75 × 75 × 250 | |
| Solidification temp. °F. (°C.) | 14 | (−10) |

[a]Produced from previous batch and supplied about 33% of the total batch volume.
[b]Highest temperature to which mixture reached during addition of anhydrous ammonia. Water loss due to boiling was about 38 pounds.
[c]Temperature to which suspension is cooled before addition of clay.

The physical properties both before and after 60 days of storage at 80° F. and 100° F. are shown in Table III below for 11-39-0, 1.5 percent clay grade suspensions that were prepared by our new batch-type procedure from Central Florida wet-process acid.

TABLE III

Physical Properties of 11-39-0, 1.5 Percent Clay Suspensions Produced by the New Batch-Type Procedure from Wet-Process Orthophosphoric Acid[a] (54% $P_2O_5$) Derived from Central Florida Phosphate Ore

| Suspension grade | Initial viscosity[b] cP at 80° F. | After quiescent storage for 60 days at | | | |
|---|---|---|---|---|---|
| | | 80° F. | | 100° F. | |
| | | Viscosity[b] cP at 80° F | Pourability[c] % of total vol | Viscosity[b] cP at 80° F. | Pourability % of total vol |
| 11.4-39.6-0 | 650 | 650 | 100 | 800 | 100 |
| 11.2-39.3-0 | 700 | 600 | 100 | 700 | 100 |
| 11.3-38.9-0 | 650 | 700 | 100 | 750 | 100 |

[a]Wet-process acid contained 53.0% $P_2O_5$, 3.4% $SO_4$, 1.4% $Al_2O_3$, 1.7% $Fe_2O_3$, 0.7% MgO, and 0.99% F.
[b]Suspensions were mixed for 5 minutes with a propeller-type stirrer operating at a tip speed of 7 ft/s before viscosity measurements were made.
[c]Measurements after agitation supplied by gently rotating a stirring rod twice around the inside of the container. No crystals exceeded 850 micrometers in size.

EXAMPLE III

Since monoammonium phosphate (MAP) has been both more available and of lower cost per unit of $P_2O_5$ at times during recent years than merchant-grade wet-process acid, it was tested for use in production of high-analysis (11-39-0, 1.5% clay) base suspension by our new batch-type process as described in Example I, supra.

In this test, one-half of the $P_2O_5$ for production of the 11-39-0 grade suspension was supplied from MAP and the other half was supplied as merchant-grade, wet-process acid derived from Central Florida phosphate ore. The formulation and operating conditions for production of an B 11-39-0, 1.5 percent base suspension with good physical properties are shown in Table IV below.

TABLE IV

Operating Conditions and Results of the Batch Production of 11-39-0 Grade Suspension Fertilizer with Half of $P_2O_5$ Supplied from Each of Wet-Process Phosphoric Acid and Monoammonium Phosphate

| Batch reactor | | |
|---|---|---|
| Feed, lb (kg) | | |
| Heel[a] | 125 | (56.8) |
| Water | 96.5 | (43.9) |
| Monoammonium phosphate (11-54-0 grade)[b] | 135.5 | (61.6) |
| Wet-process phosphoric acid (54% $P_2O_5$)[b] | 135.5 | (61.6) |
| Ammonia | 32 | (14.5) |
| Temperature (boiling)[c] °F. (°C.) | 230 | (110) |
| Agitator tip speed, ft/s (m/s) | 33 | (10) |
| Mixing time, min | 15 | |
| Cooler | | |
| Temperature,[d] °F. (°C.) | 130 | (54) |
| Clay added, lb (kg) | 7.5 | (3.4) |
| Agitator tip speed, ft/s (m/s) | 33 | (10) |
| Mixing time, min | 10 | |
| Product (11-39-0, 1.5% clay) | | |
| Batch size, lb (kg)[e] | 500 | (226.8) |
| Total batch time, min | 25 | |
| pH (undiluted) | 6.0 | |
| Specific gravity at 80° F. (27° C.) | 1.44 | |
| Temp. (as sent to storage), °F. (°C.) | 100 | (37.7) |
| Viscosity, cP (Pa · s) | | |
| 80° F. (27° C.) | 800 | (0.8) |
| 32° F. (0° C.) | 1400 | (1.4) |
| Pourability, vol. % | | |
| 80° F. (27° C.) | 100 | |
| 32° F. (0° C.) | 100 | |
| Crystal size (ammonium phosphate), μm | 100 × 100 × 400 | |

[a]Produced from previous batch and supplied 25% of total operating volume in the batch.
[b]Supplied 50% of $P_2O_5$ in the batch.
[c]Highest temperature to which mixture reaches during addition of anhydrous ammonia. Water loss due to boiling was about 24 pounds.
[d]Temperature to which suspension is cooled before addition of clay.
[e]Assured amount of water lost by evaporation equaled the amount of ammonia fed.

The results illustrated in Table IV, supra, clearly show that concentrated high quality suspension fertilizers of grade 11-39-0, 1.5 percent attapulgite clay that are entirely satisfactory for application to the soil, use in production of mixed suspension fertilizers with various ratio and grade, or long-term quiescent storage can be realized by our new batch-type procedure from mixtures of MAP and merchant-grade, wet-process acid each supplying half of the $P_2O_5$.

EXAMPLE IV

Tests were made to determine the effect of size of the heel on viscosity and pourability of suspensions made by our new batch-type procedure or process. In making the tests, other variables such as impurities in the acid, $N:P_2O_5$ weight ratio, retention time in the reactor, size of crystals in the product, etc., that are known to have effects on viscosity and pourability were kept constant throughout the series.

Results obtained from these tests, shown in Table V infra, indicate that the highest satisfactory nominal suspension grade, as made by the procedure shown in Example I supra and determined by viscosity and pourability measurements, was 13-38-0, 1.5 percent attapulgite clay. The volume of the heel ranged between about 40 percent and 50 percent of the total volume of the batch. With decrease in size of the heel to 30 percent, the highest satisfactory grade was 13-37-0, 1.5 percent clay. With further reduction in the heel to 20 percent of the total batch volume, the highest satisfactory grade was only 12-36-0, and with still further reduction in the volume of the heel to 10 percent (not shown in Table V), partial solidification was observed and severe losses of ammonia occurred.

TABLE V

Production of Concentrated Phosphate Base Suspension Fertilizers from Central Florida Wet-Process Orthophosphoric Acid[a] by the New Batch-Type Process[b]. Effect of Size of the Heel on Quality of the Suspension Product as Shown by Measurements of Viscosity and Pourability

| Heel % of total batch volume | Highest nominal suspension grade[c] | Before storage | | After 30 days of storage | | | |
|---|---|---|---|---|---|---|---|
| | | Viscosity,[d] cP | Pourability, % of total volume | Storage temp. | Evaluation temp. | Viscosity,[d] cP | Pourability,[e] % of total volume |
| 50 | 13-38-0 | 650 | 100 | 80 | 80 | 600 | 100 |
| | | | | | 32 | 1350 | 100 |
| | | | | 100 | 80 | 700 | 100 |
| | | | | | 32 | 1150 | 100 |
| 40 | 13-38-0 | 650 | 100 | 80 | 80 | 750 | 100 |
| | | | | | 32 | 1350 | 100 |
| | | | | 100 | 80 | 750 | 100 |
| | | | | | 32 | 1200 | 100 |
| 30 | 13-37-0 | 750 | 100 | 80 | 80 | 850 | 100 |
| | | | | | 32 | 1400 | 100 |
| | | | | 100 | 80 | 750 | 100 |
| | | | | | 32 | 1200 | 100 |
| 20 | 12-36-0 | 950 | 100 | 80 | 80 | 850 | 0 |
| | | | | | 32 | 1450 | 0 |
| | | | | 100 | 80 | 600 | 0 |
| | | | | | 32 | 1500 | 0 |

[a]Wet-process acid contained 53% $P_2O_5$, 3.4% $SO_4$, 1.4% $Al_2O_3$, 1.7% $Fe_2O_3$, 0.7% MgO, 0.07% CaO, and 0.99% F.
[b]Process consisted of equipment shown in FIG. 1.
[c]Suspension contained 1.5% attapulgite clay and no crystals exceeded the limit of 850 micrometers.
[d]Suspension were mixed for 5 minutes with a propeller-type stirrer operated at a tip speed of 7 ft/s before measurements were made.
[e]After agitation supplied by gently rotating a stirring rod twice around the inside of container.

After sifting and winnowing through the data supra, as well as other results of tests and operation of our new, novel, and improved method for the production of high-analysis ammonium ortho- and polyphosphate suspension fertilizers by a new batch-type process, we now present the following acceptable and preferred ranges of operating conditions.

Acceptable and Preferred Parameters for Production of 11-39-0 Suspension Fertilizer with Half of the P₂O₅ Supplied from Each of Wet-Process Acid and Monoammonium Phosphate

| | Operating Range | Preferred (about) | Most Preferred |
|---|---|---|---|
| Reactor | | | |
| Acid concentration | 38–54 | 48–54 | 52–54 |
| Monoammonium phosphate | 10-50-0–11-54-0 | 11-52-0–11-54-0 | 11-54-0 |
| Temperature, °F.$^a$ | 200–230 | 220–230 | 225–230 |
| Retention time, minutes | 10–45 | 10–30 | 10–20 |
| Heel (% of total batch, vol.) | 20–60 | 30–50 | 33–40 |
| N:P₂O₅ weight ratio | 0.260–0.300 | 0.270–0.290 | 0.280–0.285 |
| Cooler-Clay Mixer | | | |
| Heel (% of total batch, vol.) | 20–60 | 30–50 | 33–40 |
| Temperature, °F.$^b$ | 100–140 | 120–140 | 125–135 |
| Retention time, minutes | 5–30 | 5–20 | 5–10 |
| Clay, % | 1–2 | 1–2 | 1.5 |
| pH (diluted 1:4 with H₂O) | 5.6–6.4 | 5.8–6.2 | 6.0–6.1 |
| Agitator tip speed, ft/s | 20–100 | 25–50 | 30–35 |

$^a$In production of this suspension, the temperature in the reactor is limited to about 200° F. to eliminate ammonium phosphate crystals and prevent excessively large crystals in the product.
$^b$For production of an abundance of ammonium phosphate crystals, the temperature in the cooler should not exceed about 140° F.

Acceptable and Preferred Parameters for Production of 11-39-0 Ammonium Polyphosphate (APP) Suspension Fertilizers from Granular APP

| | Operating Range | Preferred (about) | Most Preferred |
|---|---|---|---|
| Reactor | | | |
| Ammonium polyphosphate | 10-53-0–11-55-0 | 11-54-0–11-55-0 | 11-55-0 |
| % of total P₂O₅ as poly | 5–20 | 10–20 | 10–15 |
| Temperature, °F.$^a$ | 175–200 | 185–195 | 185–190 |
| N:P₂O₅ weight ratio | 0.260–0.300 | 0.270–0.290 | 0.280–0.285 |
| Retention time, minutes | 10–45 | 10–30 | 10–20 |
| Cooler-Clay Mixer | | | |
| Heel (% of total batch, vol.) | 20–60 | 30–50 | 33–40 |
| Temperature, °F.$^b$ | 100–140 | 120–140 | 125–135 |
| Retention time, minutes | 5–30 | 5–20 | 5–10 |
| Clay, % | 1–2 | 1–2 | 1.5 |
| pH (diluted 1:4 H₂O) | 5.6–6.4 | 5.8–6.2 | 6.0–6.1 |
| Agitator tip speed, ft/s | 20–100 | 25–50 | 30–35 |

$^a$In production of this suspension, the temperature in the reactor is limited to about 150° F. to ensure complete disintegration of the APP granules and to eliminate ammonium phosphate crystals and prevent excessively large crystals in the product.
$^b$This product is not expected to be shipped long distances; however, for production of an abundance of small crystals, elimination of crystal growth, and prevention of loss of polyphosphate, the temperature in the cooler should not exceed about 140° F.

Acceptable and Preferred Parameters for Production of 11-39-0 Suspension Fertilizers from Merchant-Grade Wet-Process Orthophosphoric Acid

| | Operating Range | Preferred (about) | Most Preferred |
|---|---|---|---|
| Reactor | | | |
| Acid concentration | 38–54 | 48–54 | 52–54 |
| Temperature, °F.$^a$ | 200–230 | 220–230 | 225–230 |
| N:P₂O₅ weight ratio | 0.260–0.300 | 0.270–0.290 | 0.280–0.285 |
| Retention time, minutes | 10–45 | 10–30 | 10–20 |
| Heel (% of total batch, vol.) | 20–60 | 30–50 | 33–40 |
| Cooler-Clay Mixer | | | |
| Heel (% of total batch, vol.) | 20–60 | 30–50 | 33–40 |
| Temperature, °F.$^b$ | 100–140 | 120–140 | 125–135 |
| Retention time, minutes | 5–30 | 5–20 | 5–10 |
| Clay, % | 1–2 | 1–2 | 1.5 |
| pH (diluted 1:4 with H₂O) | 5.6–6.4 | 5.8–6.2 | 6.0–6.1 |
| Agitator tip speed, ft/s | 20–100 | 25–50 | 30–35 |

$^a$In production of this suspension, the temperature in the reactor is limited to about 200° F. to eliminate ammonium phosphate crystals and prevent excessively large crystals in the product.
$^b$This product is not expected to be shipped long distances; however, for production of an abundance of small crystals and elimination of crystal growth, the temperature in the cooler should not exceed about 140° F.

Acceptable and Preferred Parameters for Production of 13-38-0 Suspension Fertilizer from Merchant-Grade Wet-Process Orthophosphoric Acid

| | Operating Range | Preferred (about) | Most Preferred |
|---|---|---|---|
| Reactor | | | |
| Acid concentration | 38–54 | 48–54 | 52–54 |
| Temperature, °F.$^a$ | 200–230 | 220–230 | 225–230 |
| N:P₂O₅ weight ratio | 0.260–0.300 | 0.270–0.290 | 0.280–0.285 |
| Retention time, minutes | 10–45 | 10–30 | 10–20 |
| Heel (% of total batch, vol.) | 20–60 | 30–50 | 33–40 |
| Cooler-Clay Mixer | | | |
| Heel (% of total batch, vol.) | 20–60 | 30–50 | 33–40 |
| Temperature, °F.$^b$ | 100–140 | 120–140 | 125–135 |
| Retention time, minutes | 5–30 | 5–20 | 5–10 |
| Clay, % | 1–2 | 1–2 | 1.5 |
| N:P₂O₅ weight ratio | 0.330–0.360 | 0.340–0.355 | 0.345–0.355 |
| pH (diluted 1:4 with H₂O) | 6.4–7.2 | 6.6–7.0 | 6.8–7.0 |
| Agitator tip speed, ft/s | 20–100 | 25–50 | 30–35 |

$^a$In production of this suspension, the temperature in the reactor is limited to about 200° F. to eliminate ammonia phosphate crystals and prevent excessively large crystals in the product that settle and pack during long distance shipment.
$^b$For production of an abundance of ammonium phosphate crystals, the temperature in the cooler should not exceed about 140° F.

Acceptable and Preferred Parameters for Production of 17-28-0 Urea-Ammonium Polyphosphate Suspension Fertilizers from Granular Impure Urea Phosphate

| | Operating Range | Preferred (about) | Most Preferred |
|---|---|---|---|
| Reactor | | | |
| Urea phosphate | 15-40-0–16-41-0 | 15-41-0–16-41-0 | 16-41-0 |
| % of total P₂O₅ as poly | 5–20 | 10–20 | 10–15 |
| Temperature, °F.$^a$ | 230–250 | 235–250 | 240–350 |
| N:P₂O₅ weight ratio | 0.55–0.65 | 0.58–0.64 | 0.59–0.61 |
| Retention time, minutes | 10–45 | 10–30 | 20–30 |
| Heel (% of total batch, vol.) | 20–60 | 30–50 | 33–40 |
| Cooler-Clay Mixer | | | |
| Heel (% of total batch, vol.) | 20–60 | 30–50 | 33–40 |
| Temperature, °F.$^b$ | 100–140 | 120–140 | 125–135 |

Acceptable and Preferred Parameters for Production of 17-28-0 Urea-Ammonium Polyphosphate Suspension Fertilizers from Granular Impure Urea Phosphate

| | Operating Range | Preferred (about) | Most Preferred |
|---|---|---|---|
| Retention time, minutes | 5–30 | 5–20 | 5–10 |
| Clay, % | 1–2 | 1–2 | 1.5 |
| pH (diluted 1:4 $H_2O$) | 5.6–6.4 | 5.8–6.2 | 6.0–6.1 |
| Agitator tip speed, ft/s | 20–100 | 25–50 | 30–35 |

[a] In production of this suspension, the temperature in the reactor is limited to about 230° F. to allow condensation reaction to occur. The condensation reaction converts a portion of the orthophosphate to polyphosphate by utilizing the urea component of the urea phosphate.

[b] This product is not expected to be shipped long distances; however, for production of an abundance of small crystals, elimination of crystal growth, and prevention of loss of polyphosphate, the temperature in the cooler should not exceed about 140° F.

While we have shown and described particular embodiments of our invention, modifications and variations thereof will occur to those skilled in the art. We wish it to be understood therefore that the appended claims are intended to cover such modifications and variations which are within the true scope and spirit of our invention.

What we claim as new and desire to secure by Letters Patent of the United States is:

1. A batch-type process for the production of suspension type fertilizers from ammonia and wet-process phosphoric acid or solid particles derived from such wet-process phosphoric acid, or mixtures thereof, which suspensions have high plant food contents, excellent flow properties, low viscosities, good storage properties, and do not contain settled crytals after exposure to substantial vibration, which process comprises the steps of:

(1) maintaining in reactor means as a first heel of material therein predetermined quantities of at least partially ammoniated wet-process phosphoric acid, ammoniated materials derived from wet-process phosphoric acid, or ammoniated mixtures thereof, said first heel of material effected by the performance of step 5, infra;

(2) introducing in predetermined proportions a stream of ammonia, of water, and of wet-process phosphoric acid or solid particles of material derived from wet-process phosphoric acid, or mixtures thereof, into contact with said first heel of material maintained in said reactor means to effect at least a partially ammoniated feed phosphoric acid material therein having a $N:P_2O_5$ weight ratio ranging from about 0.26 to about 0.3, the volume ratio of the aggregate of said proportions of ammonia, water, and acid or materials derived therefrom, to said first heel of material ranging from about 0.67:1 to about 4:1;

(3) maintaining the temperature of the material in said reactor means, after the introduction of said proportions of ammonia, water, and phosphoric acids or solids derived therefrom, in the range from about 200° F. to about 230° F., and retaining same therein for a time ranging from about 10 minutes to about 45 minutes;

(4) removing from said reactor means a portion of said at least partially ammoniated material and introducing same, along with clay or clay and predetermined quantities of ammonia into contact with a second heel of material maintained in cooling means, said second heel of material effected by the performance of step 8 infra, the volume ratio of the aggregate of said at least partially ammoniated material, clay or clay and ammonia, to said second heel of material ranging from about 0.67:1 to about 4:1;

(5) reserving that portion of said at least partially ammoniated material remaining in said reactor means as said first heel of material maintained therein in step 1 supra;

(6) maintaining the temperature of the materials in said cooling means, after the introduction of said at least partially ammoniated material, clay, or clay and ammonia, in the range from about 100° F. to about 140° F. for a period of time ranging from about 5 minutes to about 30 minutes;

(7) removing from said cooling means a portion of the resulting ammoniated and cooled product suspension and transferring same to product storage; and (8) reserving that portion of the resulting cooled product suspension remaining in said cooling means as said second heel of material maintained therein in step 4, supra.

2. The process of claim 1 for preparing an 11-39-0 grade suspension fertilizer wherein from about one-half to substantially all of the $P_2O_5$ values therein are contributed by the introduction to said reactor means of wet-process phosphoric acid, said wet-process phosphoric acid ranging in concentration from about 48 percent to about 54 percent $P_2O_5$ and the remaining $P_2O_5$ values are contributed by the introduction to said reactor means of monoammonium phosphate, said monoammonium phosphate ranging in grade from about 11-52-0 to about 11-54-0, wherein substantially all of the ammonia added to said batch process is introduced into said reactor means to effect therein an $N:P_2O_5$ weight ratio in the range from about 0.27 to about 0.29, and wherein the volume ratio of the materials added to both said reactor means and said cooling means to the materials maintained therein ranges from about 1:1 to about 2.3:1.

3. The process of claim 2 wherein the $N:P_2O_5$ weight ratio in said reactor means is maintained in the range from about 0.280 to about 0.285 and wherein the volume ratio of the materials added to both said reactor means and said cooling means to the materials maintained therein ranges from about 1.5:1 to about 2.0:1.

4. The process of claim 1 for preparing 11-39-0 grade suspension fertilizers wherein substantially all of the $P_2O_5$ values therein are contributed by the introduction to said reactor means of ammonium polyphosphate material ranging in grade from about 10-53-0 to about 11-55-0 and containing from about 5 to about 20 percent by weight of the $P_2O_5$ values therein in the form of polyphosphates, wherein substantially all of the ammonia added to said batch process is introduced into said reactor means to effect therein an $N:P_2O_5$ weight ratio in the range from about 0.26 to about 0.30, and wherein the volume ratios of the material added to said cooling means to the materials maintained therein ranges from about 0.67:1 to about 4:1.

5. The process of claim 4 wherein the $N:P_2O_5$ weight ratio in said reactor means is maintained in the range from about 0.27 to about 0.29, and wherein the volume ratio of the material added to said cooling means to the materials maintained therein ranges from about 1.0 to about 2.3.

6. The process of claim 4 wherein the N:P$_2$O$_5$ weight ratio in said reactor means is maintained in the range from about 0.58 to about 0.64 and wherein the volume ratio of the materials added to both said reactor means and cooling means to the materials maintained therein ranges from about 1:1 to about 2.3:1.

7. The process of claim 1 for preparing a 17-28-0 urea ammonium polyphosphate suspension fertilizer wherein substantially all of the P$_2$O$_5$ values therein are contributed by the introduction to said reactor means of urea ranging from about 15-40-0 to about 16-41-0, wherein substantially all of the ammonia added to said batch processes is introduced into said reactor means to effect therein an N:P$_2$O$_5$ weight ratio of about 0.55 to about 0.65, a polyphosphate content of 5 to 20 percent of the P$_2$O$_5$, and wherein the volume ratio of the materials added to both said reactor means and cooling means to the materials maintained therein ranges from about 0.67:1 to about 4:1.

8. A batch-type process for the production of suspension type fertilizers of grade about 13-38-0 from ammonia and wet-process phosphoric acid, which suspensions have high plant food contents, excellent flow properties, low viscosities, good storage properties, and do not contain settled crystals after exposure to substantial vibration, which process comprises the steps of:
  (1) maintaining in reactor means as a first heel of material therein predetermined quantities of partially ammoniated wet-process phosphoric acid, said first heel of material effected by the performance of step (7), infra;
  (2) introducing in predetermined portions a stream of ammonia, of water, and of wet-process phosphoric acid, said wet-process phosphoric acid containing from about 38 to about 54 percent by weight P$_2$O$_5$, into contact with said first heel of material maintained in said reactor means to effect a partially ammoniated feed phosphoric acid material therein having an N:P$_2$O$_5$ weight ratio ranging from about 0.26 to about 0.3;
  (3) maintaining the temperature of the material in said reactor means, after the introduction of said portions of ammonia, water, and acid in the range from about 200° F. to about 230° F. for a period of time ranging from about 10 to about 45 minutes;
  (4) removing from said reactor means a portion of said partially ammoniated material from said reactor means and introducing same along with predetermined quantities of ammonia and clay into contact with a second heel of material maintained in cooling means, said predetermined quantities of ammonia contacting said partially ammoniated material, said clay, and said second heel of material being sufficient to effect an ammoniated material therein having an N:P$_2$O$_5$ weight ratio in the range from about 0.33 to about 0.36, said second heel of material effected by the performance of step 8 infra, the volume ratio of the aggregate of said partially ammoniated material, ammonia, and clay to said second heel of material ranging from about 0.67:1 to about 4:1;
  (5) reserving that portion of said partially ammoniated material remaining in said reactor means as said first heel of material maintained therein in step 1, supra;
  (6) maintaining the temperature of the materials in said cooling means, after the introduction of said partially ammoniated material, ammonia, and clay in the range from about 100° F. to about 140° F. for a period of time ranging from about 5 minutes to about 30 minutes;
  (7) removing from said cooling means a portion of the resulting ammoniated and cooled product suspension and transferring same to product storage; and
  (8) reserving that portion of the resulting cooled product suspension remaining in said cooling means as said second heel of material maintained therein as in step 4, supra.

9. The process of claim 8 wherein the ammonia added to said process is proportioned to maintain an N:P$_2$O$_5$ weight ratio in said reactor means in the range from about 0.280 to about 0.285 and in said cooler means from about 0.345 to about 0.355, and wherein the volume ratios of the material added to both said reactor means and said cooling means to the materials maintained therein ranges from about 1.5:1 to about 2.0:1.

10. The process of claim 8 wherein the ammonia added to said process is proportioned to maintain an N:P$_2$O$_5$ weight ratio in said reactor means in the range from about 0.27 to about 0.29 and in said cooler means in the range from about 0.340 to about 0.355, and wherein the volume ratios of the material added to both said reactor means and said cooling means to the materials maintained therein ranges from about 1:1 to about 2.3:1.

* * * * *